Nov. 1, 1932. S. W. BISHOP 1,886,160
TIRE DEFLATION ALARM
Filed Dec. 1, 1930
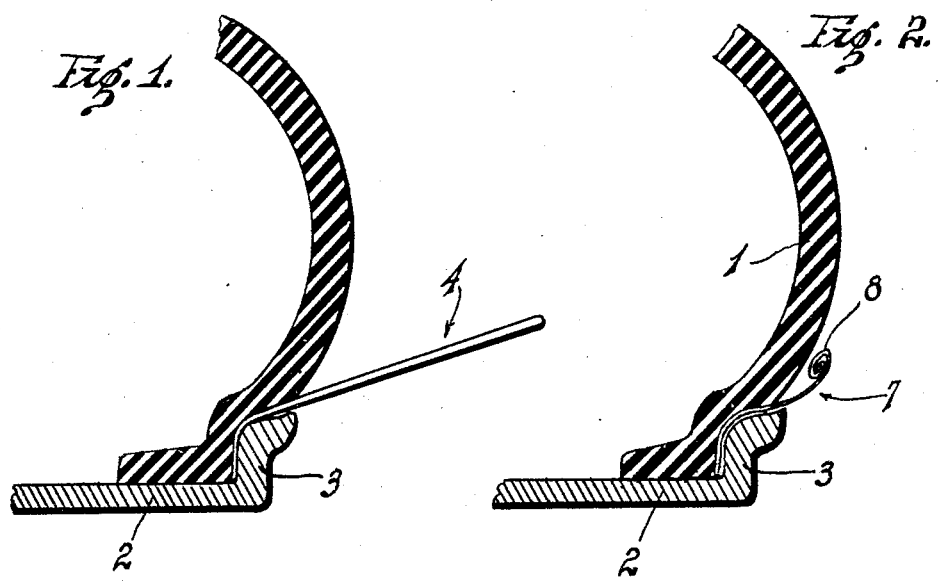
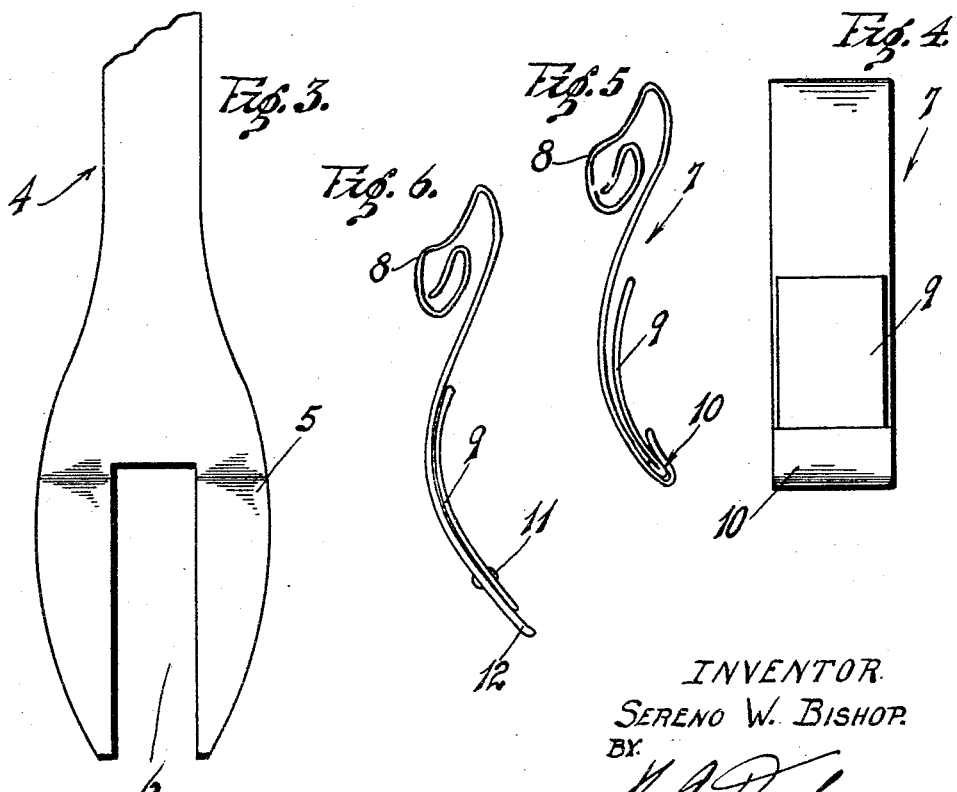
INVENTOR.
SERENO W. BISHOP.
BY
ATTORNEY.

Patented Nov. 1, 1932

1,886,160

UNITED STATES PATENT OFFICE

SERENO W. BISHOP, OF LONG BEACH, CALIFORNIA

TIRE DEFLATION ALARM

Application filed December 1, 1930. Serial No. 499,183.

This invention relates to a tire deflation alarm whereby the deflation of a tire is indicated by the sharp click made by a spring alarm mounted adjacent to the tire.

An object of my invention is to provide a deflation alarm of the character stated which can be mounted between the tire and the rim without first deflating the tire.

Another object is to provide a tire alarm of the character stated which is simple in construction, and inexpensive to manufacture.

Other objects, advantages, and features of invention may appear from the accompanying drawing, the subjoined detailed description, and the appended claims.

In the drawing

Figure 1 is a fragmentary, transverse, sectional view of a tire and rim with my mounting tool in position.

Figure 2 is a fragmentary, transverse, sectional view of a tire and rim with my tire alarm mounted thereon.

Figure 3 is a fragmentary plan view of my mounting tool.

Figure 4 is a plan view of my tire alarm.

Figure 5 is a side view of the same.

Figure 6 is a side view of a slightly modified form of alarm.

Referring more particularly to the drawing, the numeral 1 indicates a tire which is mounted on a rim 2 in the usual and well known manner. The rim is provided with upstanding side walls 3, all of which is usual and well known. The tire naturally presses against the side walls of the rim to hold the tire in proper position and against a tendency to spread outwardly. My tire alarm may be mounted between the tire and the rim without first deflating the tire, by the following means: A tool 4 is provided with a bifurcated lower end 5. The bifurcations being spaced to provide an elongated slot 6. The tool is driven between the rim and the tire as shown in Figure 4. The bifurcations are curved so that they will readily fit around the curved upper edge of the side walls 3 as shown in Figure 1.

My tire alarm 7 consists of a strip of spring steel, the outer end of which is curled under as at 8 so as to provide a rounded surface against which the tire bears when it is deflated. A reinforcing plate 9 is attached to the lower end of the alarm for the purpose of stiffening the same so that it may be driven between the tire and the rim after the tool 4 has been inserted. The reinforcing strip 9 may be secured to the spring by various means and I have here shown the end of the spring crimped around the bottom of the strip as at 10. The reinforcing strip 9 may also be secured to the spring by means of a rivet, by welding, or any other suitable means, as shown at 11 in Figure 6.

After the mounting tool has been driven between the tire and the rim as shown in Figure 1, the alarm is inserted in the slot 6 between the bifurcations 5. A screw driver or the like may be pressed against the reinforcing strip 9 so as to drive the alarm into position. The mounting tool 4 is removed after the tire alarm has been mounted and the outward pressure of the tire against the rim will hold the alarm against displacement.

If desired, the lower end of the spring may protrude below the reinforcing strip 9 as shown at 12, and this protruding tip can be driven under the tire thus further securing the alarm in position. When the tire is deflated, it will engage the curved end 8 and cause the spring strip to flex back and forth, thus causing it to emit a sharp click which will warn the driver that the tire is flat.

Having described my invention, I claim:

1. A tire alarm adapted to be mounted between the tire and the rim comprising a spring strip, one end of said spring strip being curled whereby a rounded surface is provided for contact with the tire, a reinforcing plate, the end of said spring strip being crimped over the plate to hold the same in position, said reinforcing plate being mounted on the end of the spring strip which extends between the tire and the rim.

2. A tire alarm comprising a strip, said strip being formed of spring metal, a metal reinforcing plate, means securing said reinforcing plate to the spring strip adjacent one end thereof, said reinforcing plate and end of the spring strip being adapted to extend between the tire and the rim, and the outer end of said spring strip being curled so as to provide a rounded surface for contact with the tire, said rounded surface being integral with the spring strip.

In testimony whereof, I affix my signature.
SERENO W. BISHOP.